United States Patent
Mussari

(10) Patent No.: US 8,663,473 B2
(45) Date of Patent: Mar. 4, 2014

(54) DIGESTION OF BIOSOLIDS IN WASTEWATER

(75) Inventor: Frederick P. Mussari, Melbourne, FL (US)

(73) Assignee: BCR Environmental Corporation, Jacksonville, FL (US)

( * ) Notice: Subject to any disclaimer, the term of this patent is extended or adjusted under 35 U.S.C. 154(b) by 0 days.

(21) Appl. No.: 13/529,908

(22) Filed: Jun. 21, 2012

(65) Prior Publication Data

US 2013/0015129 A1     Jan. 17, 2013

Related U.S. Application Data

(63) Continuation of application No. PCT/US2010/062106, filed on Dec. 24, 2010.

(60) Provisional application No. 61/290,082, filed on Dec. 24, 2009.

(51) Int. Cl.
*C02F 3/28*   (2006.01)
*C02F 11/04*  (2006.01)

(52) U.S. Cl.
USPC .............................. 210/603; 210/631; 210/259

(58) Field of Classification Search
USPC .................. 210/603, 612, 613, 631, 252, 259
See application file for complete search history.

(56) References Cited

U.S. PATENT DOCUMENTS

| | | | | |
|---|---|---|---|---|
| 2,081,039 A | * | 5/1937 | Kessener | 210/542 |
| 4,384,956 A | * | 5/1983 | Mulder | 210/603 |
| 5,057,220 A | * | 10/1991 | Harada et al. | 210/605 |
| 5,820,760 A | * | 10/1998 | Spector | 210/610 |
| 5,888,307 A |   | 3/1999 | Solheim | |
| 5,976,375 A | * | 11/1999 | Dorica et al. | 210/610 |
| 6,521,129 B1 | * | 2/2003 | Stamper et al. | 210/603 |
| 6,569,332 B2 | * | 5/2003 | Ainsworth et al. | 210/603 |
| 6,913,700 B2 |   | 7/2005 | Solheim | |
| 7,491,453 B2 |   | 2/2009 | Logan et al. | |
| 2005/0279706 A1 | * | 12/2005 | Reimers et al. | 210/631 |

FOREIGN PATENT DOCUMENTS

| | | |
|---|---|---|
| JP | 06-182365 | 7/1994 |
| JP | 2004-506487 A | 3/2004 |
| JP | 2006-272234 A | * 10/2006 |
| JP | 2006272234 A | 10/2006 |
| WO | 9634841 A1 | 11/1996 |
| WO | 2010126548 A1 | 11/2010 |
| WO | 2011071862 A2 | 6/2011 |
| WO | 2011139758 A2 | 11/2011 |

OTHER PUBLICATIONS

Machine-generated English translation of JP2006-272234, generated on Dec. 27, 2012.*
Written Opinion dated Oct. 27, 2011 for International Application No. PCT/US2010/062106 (6 pages).
International Preliminary Report on Patentability dated Jun. 26, 2012 for International Application No. PCT/US2010/062106 (7 pages).
International Search Report dated Oct. 27, 2011 for International Application No. PCT/US2010/062106 (3 pages).

* cited by examiner

*Primary Examiner* — Fred Prince
(74) *Attorney, Agent, or Firm* — Lando & Anastasi, LLP

(57) ABSTRACT

A method enhancing biological digestion of wastewater sludge is provided. The method uses chlorine dioxide to accelerate and improve the efficiency of aerobic or anaerobic digestion.

10 Claims, 3 Drawing Sheets

DIGESTION OF BIOSOLIDS IN WASTEWATER

CROSS-REFERENCE TO RELATED APPLICATIONS

This application is a continuation of and claims priority to International Application Number PCT/US2010/062106, titled IMPROVED DIGESTION OF BIOSOLIDS IN WASTEWATER, filed Dec. 24, 2010, which claims priority to U.S. Provisional Application Ser. No. 61/290,082, titled, IMPROVED DIGESTION OF BIOSOLIDS IN WASTEWATER, filed Dec. 24, 2009, which patent applications are hereby incorporated herein by reference in their entireties for all purposes.

FIELD OF INVENTION

This invention relates to the systems and processes for improving biological digestion processes. In particular, the invention relates to methods of using chlorine dioxide to improve the microbial activity of specific organisms in aerobic or anaerobic digestion processes as related to wastewater treatment through the reduction of competing organisms which may or may not be pathogens, and by mechanically altering the cell wall of the substrate (organic material) to facilitate the process by making nutrients available for metabolism by the desired microbiological organisms.

BACKGROUND

In the treatment of municipal wastewater, a sludge is produced which contains a substantial amount of degradable organic matter and nutrients. Beneficial reuse of this sludge cake, or biosolids material is practiced world-wide.

Wastewater enters a wastewater treatment plant as influent. This influent is typically subjected to some form of biological nutrient removal, after which the solids (sludge) are separated from the liquid (effluent) portion by some type of clarification, or settling process. The effluent can be filtered, disinfected, and discharged to surface waters or reuse. The sludge portion is traditionally transferred to some type of stabilization process, where the degradable organic matter is broken down to a non-putrescible biosolids material for disposal. Three of the most common processes used for stabilization of municipal sludge in the U.S. are anaerobic digestion, aerobic digestion, and composting.

In the process of anaerobic digestion, microorganisms break down the biodegradable material in the sludge in the absence of air. The end products of this biological degradation are a stabilized biosolids, and biogas, which is largely comprise of methane and carbon dioxide. The quantity of methane resulting from the process is directly related to the biological oxygen demand or chemical oxygen demand of the sludge consumed in the process.

While the carbohydrate and lipid component of sludge is easily degraded, the proteins are contained inside the cell walls, which must first be broken down to make the contents readily available as a nutrient for digestion. Attempts have been made related to the pre-treatment of the sludge in order to facilitate the process of anaerobic digestion. One example is the Cambi® process (U.S. Pat. Nos. 5,888,307 and 6,913,700), which uses thermal hydrolysis (high pressure steam) to make nutrients more readily available. Earlier examples include the Portous and Zimpro processes, which date back to the 1940's-60's. Thermal hydrolysis typically involves pre-treatment of the waste activated sludge by elevating temperatures of the sludge to ~135° C. for 1-2 weeks, or higher temperatures (185-200° C.) for 30 minutes. Another example of a sludge pretreatment process is the OpenCel® process, which uses pulsed, high-voltage (20-30 kV) to disrupt cell membranes and cell walls. Yet another example is the Crown® Disintegrater, which utilizes mechanical forces to shear cells and disrupt cell walls and membranes. Each of these processes are similar in that they all require high capital and operating costs.

The inventors have realized that it would be desirable to have an improved method of hydrolyzing or solubilizing sludge which results in high conversion rates of degradable organic material to biogas, has low capital and operating costs and is scaleable.

The present invention represents an innovative process which offers superior performance for the intended purpose and has extremely low capital and operating costs. This results in an obvious economic advantage over previously known methods.

SUMMARY

A system for improving the process of microbial digestion is provided which includes the use of chlorine dioxide to reduce the fecal coliform and heterotrophic bacteria populations in wastewater and to alter the cell wall structure of bacteria in the wastewater sludge so as to make nutrients more readily available for digestion is provided.

In the process of biological digestion in wastewater treatment, microorganisms break down biodegradable material, converting the substrate to carbon dioxide and water in the case of aerobic digestion, or methane and carbon dioxide in the case of anaerobic digestion.

The practice of inoculating raw sludge with digested sludge is common practice in both aerobic and anaerobic digestion, and a large number of commercial inoculums are available containing various biocatalysts and enzymes used for this purpose. While these methods serve to provide a 'stock' culture of organisms specific for their function, the inventors have realized that these organisms are faced with competition for a food source. In the case of anaerobic digestion in particular, the rate of degradation is restricted by the slow rate of hydrolysis of waste activated sludge into bio-available forms that can be utilized by methanogens.

The inventors have surmised that a new process involving chlorine dioxide will offer significant economic advantages over current methods, and provide more control of the microbes involved in digestion as well as enhance the digestion by the desired microbes. The use of chlorine dioxide to enhance digestion works by two primary mechanisms; 1) by reducing the population of non-beneficial micro-organisms prior to the seeding of a system with the specific organisms that are better suited to their function, and 2) by altering the cell walls of the substrate material to cause or facilitate cell lysis, thus making more nutrients available for the microorganisms.

This method of enhanced competitive exclusion provides significant benefits by reducing the time and energy required for the digestion process to take place, and by enhancing gas production in the case of anaerobic digestion. The 'conditioning' of the substrate material is evidenced by increased biological oxygen demand of the treated material or increased soluble chemical oxygen demand (s-COD) of the substrate material following this treatment process and by higher temperatures being reached and temperatures being elevated more quickly in composting.

According, to one embodiment, the invention pertains to a process involving obtaining a sample of raw sludge, wastewater or other sample containing biodegradable solids, subjecting the sample to an amount of chlorine dioxide sufficient to reduce or eliminate microbes in the sample and to disrupt cell walls of biosolid material, innoculating the chlorine dioxide treated sample with an innoculum of beneficial microbes, and placing the innoculated sample in conditions to facilitate aerobic or anaerobic digestion. Other inventive embodiments are described herein.

DETAILED DESCRIPTION

Figure 1:
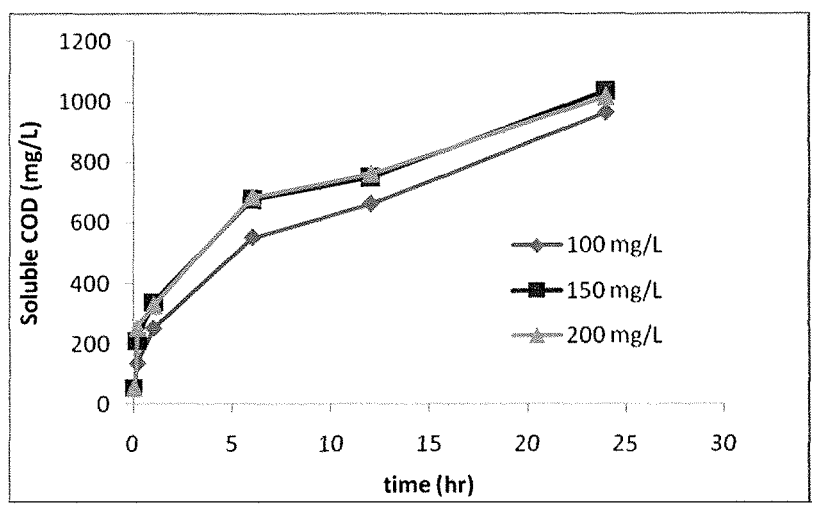
FIG. 1 shows a graph illustrating that s-COD of wastewater can increase by subjecting to a method embodiment of the invention.

The subject invention is directed to novel methods for utilizing chlorine dioxide for the enhanced digestion of municipal sludge or biosolids. In one embodiment, the present method may provide ideal conditions for accelerated composting (aerobic digestion) of municipal biosolids. In another embodiment, the present method may be used to facilitate anaerobic digestion with a resultant increase in methane yield of 50% or more versus non-pretreated biosolids.

In the first embodiment, chlorine dioxide is used to reduce the concentration of bacteria in waste-activated sludge prior to dewatering by any common method. The resulting biosolids cake, which meets the U.S. EPA requirements for pathogen reduction to Class B standards, is subsequently seeded with any commercially available blend of bacteria which are appropriate for composting processes, and the material can be blended with wood-waste or green-waste. Biosolids treated by this method can be quickly and economically composted to Class A standards.

Composting using any common method may be utilized, such as, but not limited to Turned Windrow, Aerated Static Pile (open or enclosed), Aerated Turned Windrow Horizontal Agitated Bed or In-Vessel Processes (various types). However, in a preferred embodiment, the material is composted using a forced-air static pile method in which the temperature is regulated by the addition of air to the pile to prevent the temperature from generally exceeding 150° F. so that bacteria responsible for the aerobic digestion, or degradation of the organic matter in the biosolids are not reduced by temperatures in the upper thermophilic range (150°-176° F.). The method of this invention when practiced using this embodiment has the added benefit of preventing the formation of offensive odors as a result of maintaining a high oxidation-reduction potential, initially through the addition of chlorine dioxide (>+100 mV), and later through the aeration of the pile to maintain the ORP in a positive range (>0 mV) in the treated material to prevent the activity of sulfur reducing bacteria and by preventing anaerobic conditions in the pile. Sulfur reducing bacteria are most active in a range below −100 mV ORP.

In reference to WAS treated with chlorine dioxide that is then seeded and composted, the treatment process allows the composting process to occur more rapidly because the non-digested 'conditioned' biosolids contain a higher volatile solids fraction than digested sludge and degrade more readily, which allows the pile to achieve higher temperatures faster. The lack of competition for food sources by fecal coliform bacteria, other pathogenic or potentially pathogenic bacteria allows for more rapid degradation of the material by the organisms responsible for the composting process. These conditions also provide for competitive exclusion of other undesireable organisms or potential regrowth of pathogens during the process.

The reduced time required for composting to Class A standards, combined with the reduced odors from the process makes this a viable option for municipalities that would never have considered this low-cost alternative due to concerns over available space and odors with composting.

According to another embodiment, the invention pertains to a process involving obtaining a sample of raw sludge, wastewater or other sample containing biodegradable solids, subjecting the sample to an amount of chlorine dioxide sufficient to reduce fecal coliform concentrations to meet Class B standards and to disrupt cell walls of biosolid material, innoculating the chlorine dioxide treated sample with an innoculum of beneficial microbes such as mesophilic and thermophilic bacteria (or other microbes) and/or actinomycetes, and composting the innoculated sample under conditions to convert the sample to class A biosolids. A non-limiting list of examples of common mesophilic bacteria include *Listeria monocytogenes, Pesudomonas maltophilia, Thiobacillus novellus, Staphylococcus aureus, Streptococcus pyrogenes, Streptococcus pneumoniae, Escherichia coli*, and *Clostridium kluyveri*. A non-limiting list of examples of common thermophilic bacteria include *Bacillus stearothermophilus* and bacteria of the genus *Thermus*. A variety of thermophilic fungi *Rhizomucor pusills, Chaetomium thermophile, Humicola insolens, Humicola lanuginosus, Thermoascus aurabtiacus*, and *Aspergillus fumigatus*.

Those skilled in the art, equipped with the teachings herein pertaining to the intentional reduction of microbes in the waste material through oxidant treatment and the intentional seeding (or innoculating) of microbes into the treated waste material following treatment, will be able to determine the optimal combinations of microbes to be used in inoculating the treated waste material, whether for anaerobic digestion, aerobic digestion, or composting.

The reduced time required for composting to Class A standards, combined with the reduced odors from the process makes this a viable option for municipalities that would never have considered this low-cost alternative due to concerns over available space and odors with composting.

The primary obstacles to composting for municipalities are the time/space required for the operation, and the odors generated in the process. The advantages and features of embodiments of the invention overcome these obstacles:

The use of chlorine dioxide to reduce the bacterial concentration in the biosolids. This reduces competition for nutrients of the microbes useful in the composting process. Because chlorine dioxide is highly reactive, it will reduce quickly so that no residual disinfection is present to interfere with the composting process.

The use of chlorine dioxide to 'prep' the material (cause some degree of cell lysis). This makes material more readily available for the 'good' microbes to facilitate the composting process.

The use of chlorine dioxide to reduce odors in the starting, or 'stock' material used in the composting process. This is the primary reason most facilities do not compost.

The use of non-digested sludge as a stock source is beneficial in that it provides more 'food' for the microbes.

Temperatures in the pile are typically higher with non-digested sludge. This cannot be done practically without chlorine dioxide, as the odors would make the process non-usable.

The increased speed of digestion (composting) has a marked impact on the amount of time and space that must be available for the process to take place.

Composting 'in-vessel' reduces odors further, and will allow for the use of the process in colder climates.

The cost of operating this process should be substantially less expensive than other known methods for generating Class A biosolids.

Figure 3:
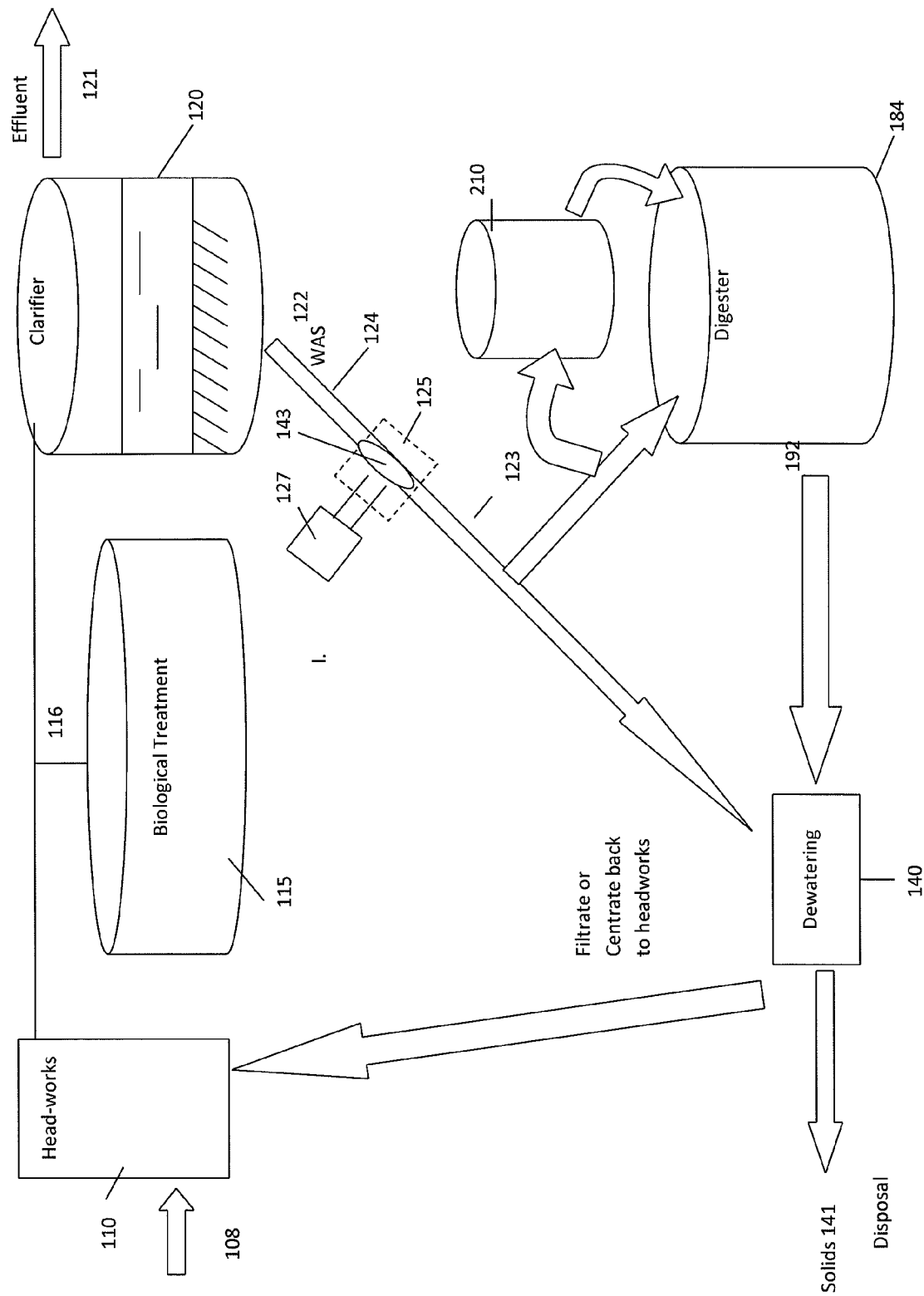
FIG. 3 is a schematic of a rudimentary wastewater treatment system of an embodiment of the invention.

Chlorine dioxide can be generated according to known methods, see for example WO 2010/126548; and PCT/US10/59208. One system for treating a waste-water sample in association with a wastewater treatment system is described in U.S. Provisional Application 61/328,363. Briefly, referring to FIG. 3, wastewater 108 first enters the headworks 110 and then is transferred to a biological treatment station 115. The biological treatment station 115 functions primarily to remove biosolid-dissociated nutrients (and a low percentage of biosolid-associated nutrients) in the wastewater to produce a nutrient-reduced wastewater sample 116. The nutrient-reduced wastewater sample 116 is transferred to a clarifier 120, where the nutrient-reduced wastewater sample 116 is separated into an effluent component 121 and a WAS component 122. The effluent component 121 $^{discarded.}$ The WAS component 122 is transported in a conduit 124 and subjected to a oxidant treatment zone 125 that is fed by an on-site oxidant generator 127 in fluid communication with the oxidant treatment zone 125. The conduit 124 includes an oxidant administration component 143, which may be integrated or separate to the conduit, wherein the chemical oxidant is administered to the WAS in a controlled manner.

In one embodiment, following oxidant treatment, the WAS 123 is transported to a dewatering device 140 (such as a belt filter press or centrifuge device) where more water is removed from the WAS to achieve a concentrated biosolids sample 141 having 12-30 percent biosolids. The, concentrated biosolids sample achieved prior to the dewatering station 140 has a higher ORP as a result of the oxidant addition. Following dewatering, the dewatered biosolids may be composted to achieve class A biosolids.

According to another embodiment, following oxidant treatment, the WAS 123 is transported to a holding tank 210. The treated WAS is allowed to 'condition' for a period of time to allow cell break up to occur as a result of the oxidant treatment. This may be for a period of 1, 2, 3, 4, 5, or 6, or more hours. Typically, the conditioning time in the holding tank is 6-24 hours. Following the conditioning time, the conditioned WAS is transferred to a digester 184. The digester 184 conducts anaerobic or aerobic digestion. In the context of anaerobic digestion for methane production, the conditioned WAS produces a higher soluble COD fraction, which facilitates increase methane production for any given volume of feed sludge. Following the oxidant treatment, beneficial microbes can be added back to the WAS to facilitate improved digestion. Microbes for digestion include acetogenic bacteria and/or methanogens (sometimes referred to as archaebacteria).

Wastewater Treatment Process

Screening And Biological Treatment

The wastewater treatment process consists of a number of sequential steps. Typically, wastewater enters a wastewater treatment plant at the headworks. The headworks acts as a primary grit and foreign matter removal system for a wastewater treatment plant. From the headworks wastewater is transferred to a form of biological treatment unit ("BTU") (i.e. an oxidation ditch, sequential batch reactor, member bioreactor, etc.). In the BTU Nutrients are removed from the wastewater. Typically, the growth of microorganisms during this biological nutrient removal step in the wastewater treatment process forms a biological floc which allows separation of the solid and liquid components of the waste stream. This material, which in healthy sludge is a brown floc, is largely composed of saprotrophic bacteria but also has an important protozoan flora mainly composed of amoebae, *Spirotrichs, Peritrichs* including *Vorticellids* and a range of other filter feeding species. Also, the wastewater is aerated while in the BTU. Subjecting the wastewater to organisms in combination with aeration to reduce nutrient content is referred to as "biological treatment."

Clarification

After screening and biological treatment, the wastewater and accumulated organic matter is sent to a clarification process. Clarification is where the water, or effluent, is separated from the solids, or organic matter known as biosolids. Once the raw sewage wastewater has been subjected to biological treatment and clarification, the biosolid sample is considered to be waste activated sludge ("WAS"). From this point, the Biosolids typically go to some type of digestion.

Digestion

The WAS accumulated after clarification must be treated and disposed of in a safe and effective manner. The purpose of digestion is to reduce the amount of organic matter and the number of disease-causing microorganisms present in the solids, and to reduce the degradable organic material in the material. The most common treatment options include anaerobic digestion and aerobic digestion.

Anaerobic digestion is a bacterial process that is carried out in the absence of oxygen. The process can either be thermophilic digestion, in which sludge is fermented in tanks at a temperature of 55° C., or mesophilic, at a temperature of around 36° C. Though allowing shorter retention time (and thus smaller tanks), thermophilic digestion is more expensive in terms of energy consumption for heating the sludge.

Anaerobic Digestion is the most common (mesophilic) treatment of Domestic Sewage in Septic Tanks, which normally retain the sewage, from one day to two days, reducing the B.O.D. by about 35 to 40%. This reduction can be increased by a combination of anaerobic and aerobic by installing 'Aerobic Treatment Units' (ATUs) in the Septic Tank.

Aerobic digestion is a bacterial process occurring in the presence of oxygen. Under aerobic conditions, bacteria rapidly consume organic matter and convert it into carbon dioxide. The operating costs used to be characteristically much greater for aerobic digestion because of the energy used by the blowers, pumps and motors needed to add oxygen to the process.

Dewatering

At a stage following, clarification and any subsequent treatment, WAS may be dewatered before they are beneficially reused. WAS is often just 3-5 percent solids, so removal of the water from the material is essential to reducing weight and the cost of further treatment or disposal or reuse. A variety of technologies are employed to dewater biosolids—including belt presses, centrifuges, and other devices.

Oxidation Reduction Potential (ORP):

Oxidation Reduction potential (also known as redox potential, oxidation/reduction potential or ORP) is a measure of the tendency of a chemical species to acquire electrons and thereby be reduced. ORP is measured in volts (V) or millivolts (mV). Each species has its own intrinsic reduction potential; the more positive the potential, the greater the species' affinity for electrons and tendency to be reduced. Different biological processes occur under different conditions, or ORP ranges. For example, methanogenic bacteria function at a very low ORP (about −300 mV). Sulfur reducing bacteria will not function well above −50 to 0 mV ORP levels. The rapid decrease in ORP after the complete reduction of chlorine dioxide can actually facilitate methane production with anaerobic digestion, and the elevation of ORP caused by chlorine dioxide addition and subsequent aeration to maintain ORP in the positive mV range can prevent anaerobic conditions from developing in a compost pile and sulfur reducing bacterial activity during aerobic digestion or composting.

Parts Per Million (PPM):

Parts per million is a way of expressing very dilute concentrations of substances. Just as per cent means out of a hundred, so parts per million or ppm means out of a million. Usually describes the concentration of something in water or soil. One ppm is equivalent to 1 milligram of something per liter of water (mg/l) or 1 milligram of something per kilogram soil (mg/kg).

EXAMPLES

Example 1

The use of chlorine dioxide to reduce pathogen and heterotrophic bacterial populations in municipal sludge has been evaluated.

Treatment of non-digested wastewater sludge with chlorine dioxide allows the material to meet Class B pathogen reduction requirements prior to digestion by reducing the fecal coliform concentrations to levels much lower than the Class B standard (<2,000,000 fecal coliform bacteria) with less than 15 minutes contact time. The resulting biosolids cake has no odor. Examples of fecal coliform reductions at varying dose rates of chlorine dioxide are listed in Table 1.

While the generation of Class B biosolids at low cost and reduced odors is perfect for many facilities, this invention provides several additional options for municipalities. WAS treated by this method can be quickly and economically composted to Class A standards. After dewatering, biosolids treated by this method have been seeded with desirable microorganisms and placed in drying beds to dry the cake to ~50% total solids, or blended with green-waste to allow air to transfer through the pile. The biosolids were then composted in windrows or using a forced-air static pile method. Seeding with appropriate micro-organisms after the fecal coliform bacteria have been reduced provides a better environment for faster composting. In-vessel composting (a variation of the forced air static pile method) minimizes odors, and provides more control over process variables. The use of WAS allows the composting process to occur rapidly because the non-digested 'conditioned' biosolids degrade more readily, which allows the pile to achieve higher temperatures faster.

The population of microorganisms active in the composting process is somewhat diverse, with a mixture of *Streptomyces* and *Bacillus* species being present, as well as a number of non-spore forming bacteria. The non-spore forming organisms are present typically at lower temperatures (below 55° C.). The greatest number of *Bacillus* species are present between temperatures ranging from 55 to 69° C.

The decomposition, or digestion rate of a composting process is negatively affected by temperatures in excess of 60° C., as this inactivates the microorganisms responsible for the composting. The ability to reach the temperature at which inactivation of pathogens begins (55° C.) quickly, and then regulate that temperature through the use of a forces-air static pile method of composting so that the temperature does not inactivate the bacteria responsible for the biological degradation of the substrate material provides significant benefits over other methods of composting municipal biosolids.

Example 2

In a second embodiment of this invention, WAS can be treated with the same or higher dose than in the first embodiment and allowed extended contact time, resulting in a greater degree of oxidation, cell lysis and release of intracellular materials, resulting in greater nutrient availability and therefore greatly enhanced microbial activity. In a more specific embodiment, the dose rate of chlorine dioxide is 50-150 mg/L and the sludge is held for 24 hours. As the chlorine dioxide

TABLE 1

Secondary sludge full-scale test results.

Secondary Sludge taken directly from the return sludge wetwell after the clarifier, no aeration

| Oct. 1, 2009 | Matrix | Units | Raw | 1 | 2 | 3 | 4 | 5 | 6 | 7 |
|---|---|---|---|---|---|---|---|---|---|---|
| Dose Rate $ClO_2$ | | mg/L | 0 | 160 | 128 | 96 | 80 | 64 | 48 | 32 |
| Fecal coliform | sludge | MPN/g | $31.1 \times 10^6$ | BDL* | BDL | BDL | BDL | 1,800 | 123,000 | $3.32 \times 10^5$ |

*Below Detection Limits

In this test, chlorine dioxide was generated on-site, and was injected (at varying concentrations) into a 100 gpm sludge flow passing through a 4 inch diameter pipe. The pipe length was sufficient to allow 10 minutes of contact time between the sludge and the chlorine dioxide prior to dewatering the material.

oxidizes material in the sludge, it is reduced to chlorite. Chlorite is also an oxidant, and is further reduced by contact with organic material. The resulting sludge contains a significantly greater amount of bioavailable material as a food source for bacteria, yet has no residual disinfection characteristics. This second embodiment is especially significant when the subsequent digestion process is anaerobic, as substantial enhancement of methane production can be realized at extremely low cost.

Treatment of non-digested wastewater sludge with chlorine dioxide to solubilized the sludge and make nutrients bio-available and then feeding this material into an established anaerobic digester once the chlorine dioxide residual has been reduced improves gas (methane) production in an anaerobic digester. A generally accepted estimate for methane production at 35° C. is 0.25 kg methane per kg COD consumed. One kmol of methane is equivalent with a mass of 16 kg. Per definition, the COD equivalent of 1 kmol of methane is the mass of the amount of oxygen required for complete oxidation according to the formula:

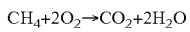

The mass of the 2 $O_2$ is 2 kmol of oxygen or 64 kg. Thus 64 kg Oxygen Demand is equivalent with 16 kg of methane, or 1 kg of oxygen demand (COD) is equivalent with 16/64=0.25 kg methane.

FIG. 1 shows the results of this process and the resultant increase in soluble chemical oxygen demand (s-COD) over time at varying dose rates. Waste activated sludge (WAS) was obtained from a local municipal WWTP which removes cBOD only and uses a pure oxygen system. In order to achieve similar experiment conditions and be consistent with the previous pilot experiment, the solids concentration was adjusted to approximately 7 g/L. Three digesters were set up and treated with chlorine dioxide dosages of 100, 150 and 200 mg/L respectively. The digesters were operated for 24 hours. Samples were taken at time intervals of 10 min, 1 h, 6 h, 12 h and 24 h to represent different contact time.

This increase in soluble COD represents 10-11% of the total COD concentration of the sludge, and represents a 2000% increase in soluble COD. The inventors believe that the higher the s-COD the higher capacity for methane production. The resulting increase in methane production as a result of this enhancement of anaerobic digestion has been measured as a greater than 50% increase utilizing this method, and is expected to be in the range of 100% or more over non-pretreated WAS. Whether a facility is using this captured biogas for heat (~600 BTU/ft$^3$) or for generation of electricity, the economic impact of this is significant.

It was found that contact time had greater impact on the increase of soluble COD concentration (FIG. 1). than the difference in chlorine dioxide dosage. With the longest contact time of 24 h, soluble COD concentration increased from 913 to 984 and 965 mg/L when chlorine dioxide dosage increased from 100 to 150 and 200 mg/L, respectively. This confirmed that chlorine dioxide contact time is the key factor for WAS solubilization. The increased soluble COD concentration can be expressed as 10-11% of TCOD which is quite significant. It was also observed that soluble COD concentration at contacting time of 6 hr was approximately 55-66% of the soluble COD at time 24 hrs. This suggested that the rapid WAS solubilization by chlorine dioxide treatment occurred in the first 6 hours. The increase of soluble COD corresponded to the volatile solids destruction of 4-6% with different chlorine dioxide treatment dosage.

Figure 2:
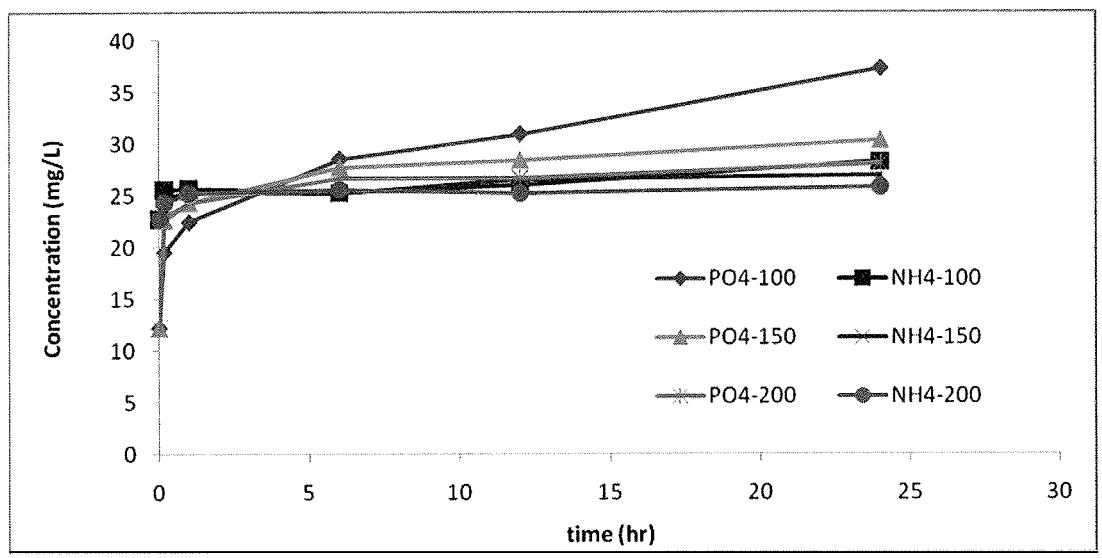
FIG. 2 shows a graph illustrating the increase in phosphate produced by treatment of WAS as described with certain embodiments.

As shown in FIG. 2 the $NH_4$ increase was 3-5.2 mg N/L was observed in all the chlorine dioxide treatments. This is considered insignificant. The $PO_4$ increase was much higher and equaled 16 to 28.3 mg P/L after 24 h. Higher phosphorus than nitrogen release can be attributed to the chlorine dioxide treatment which breaks down the cell walls resulting in the release of unbound orthophosphate $PO_4$—P. The nitrogen in the cells is in the form of organic nitrogen (amino acids) and enzymes are required to convert organic nitrogen to ammonia nitrogen. The low pH resulting from the chlorine dioxide treatment may have deactivated the enzyme activity, therefore no/insignificant $NH_4$—N increase was detected.

Example 3

Treatment of non-digested sludge with chlorine dioxide and then seeding the material with appropriate organisms under anaerobic conditions can improve biogas production. This method would have the same benefit when used in conjunction with a process to differentially produce hydrogen, or 'harvest' hydrogen prior to methanogenesis as in typical anaerobic digestion. One example of this hydrogen production would be when used in combination with a bio-electrically assisted microbial reactor to generate hydrogen gas. An example of this reactor is U.S. Pat. No. 7,491,453. Thus, in another embodiment, the invention pertains to a method of generating hydrogen gas by obtaining a sample of raw sludge, wastewater or other sample containing biodegradable solids, subjecting the sample to an amount of chlorine dioxide sufficient to reduce or eliminate microbes in the sample and to disrupt cell walls of biosolid material, innoculating the chlorine dioxide treated sample with an innoculum of beneficial microbes active under anaerobic conditions, and placing the innoculated sample under conditions to facilitate bio-electric-assisted anaerobic digestion or similar method to produce hydrogen gas, and collecting said hydrogen gas.

It should be borne in mind that all patents, patent applications, patent publications, technical publications, scientific publications, and other references referenced herein are hereby incorporated by reference in this application in order to more fully describe the state of the art to which the present invention pertains.

Reference to particular buffers, media, reagents, cells, culture conditions and the like, or to some subclass of same, is not intended to be limiting, but should be read to include all such related materials that one of ordinary skill in the art would recognize as being of interest or value in the particular context in which that discussion is presented. For example, it is often possible to substitute one buffer system or culture medium for another, such that a different but known way is used to achieve the same goals as those to which the use of a suggested method, material or composition is directed.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skilled in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A method of enhancing methane production in a wastewater treatment process comprising:
   introducing a wastewater into a biological treatment unit to provide a wastewater having a reduced nutrient content;
   separating the wastewater having the reduced nutrient content to provide an effluent and a waste activated sludge;
   contacting the waste activated sludge with an amount of chlorine dioxide in an oxidant treatment zone for a period of time sufficient to reduce a concentration of microorganisms in the waste activated sludge and provide a chlorine dioxide treated waste activated sludge having a soluble COD concentration of about 10% of a total COD concentration of the chlorine dioxide treated waste activated sludge; and
   anaerobically digesting the chlorine dioxide treated waste activated sludge downstream of the oxidant treatment zone to provide a digested waste activated sludge and methane.

2. The method of claim 1, wherein the period of time for contacting the waste activated sludge with an amount of chlorine dioxide is in a range of about 6 to 20 hours.

3. The method of claim 2, wherein the period of time for contacting the waste activated sludge with an amount of chlorine dioxide is about 24 hours.

4. The method of claim 1, further comprising seeding the chlorine dioxide treated waste activated sludge with microorganisms.

5. The method of claim 1, wherein contacting the waste activated sludge with an amount of chlorine dioxide comprises adding the chlorine dioxide at a dose rate of 50 to 150 mg/L of the waste activated sludge.

6. The method of claim 1, wherein the methane is used to provide at least one of heat or electricity.

7. The method of claim 1, wherein the soluble COD concentration is a 2000% increase in soluble COD concentration as compared to a wastewater treatment process that does not comprise contacting the waste activated sludge with an amount of chlorine dioxide for a period of time sufficient to reduce a concentration of microorganisms in the waste activated sludge and provide a chlorine dioxide treated waste activated sludge having a soluble COD concentration of about 10% of the total COD concentration of the chlorine dioxide treated waste activated sludge.

8. The method of claim 7, wherein the methane produced is at least 50% greater than methane produced in a wastewater treatment process that does not comprise contacting the waste activated sludge with an amount of chlorine dioxide for a period of time sufficient to reduce a concentration of microorganisms in the waste activated sludge and provide a chlorine dioxide treated waste activated sludge having a soluble COD concentration of about 10% of the total COD concentration of the chlorine dioxide treated waste activated sludge.

9. A system for enhancing methane production in a wastewater treatment process comprising:
   a source of wastewater;
   a biological treatment unit connected to an outlet of the source of wastewater;
   a clarifier connected to an outlet of the biological treatment unit, the clarifier having an effluent outlet and a waste activated sludge outlet;
   a conduit having a first end connected to the waste activated sludge outlet;
   a digester connected to a second end of the conduit; and
   a chlorine dioxide generator in fluid communication with an oxidant treatment zone of the conduit, the oxidant treatment zone positioned downstream from the waste activated sludge outlet and upstream of the digester.

10. The system of claim 9, further comprising a holding tank connected between the clarifier and the digester.

* * * * *